United States Patent Office

2,889,293
Patented June 2, 1959

2,889,293

MIXTURE OF CERTAIN OIL-MODIFIED ALKYD RESINS BLENDED WITH A RESINOUS REACTION PRODUCT OF CERTAIN ACIDS WITH AN ADDUCT OF AN ALKYLENE OXIDE WITH CERTAIN POLYHYDRIC ALCOHOLS

William L. Hensley, Albert J. Kirsch, and Ralph E. Layman, Jr., Stamford, Conn., assignors to American Cyanamid Company, New York, N.Y., a corporation of Maine No Drawing. Application April 2, 1956
Serial No. 575,363

20 Claims. (Cl. 260—22)

This invention relates to a novel composition of matter comprising a mixture of a glyceride oil modified alkyd resin emulsified with particular reaction products and dispersed in water under alkaline conditions. More particularly, this invention relates to an oil-in-water emulsion of a glyceride oil modified alkyd resin and the reaction product of an aliphatic polycarboxylic acid, an oil fatty acid and the adduct of alkylene oxide having 2 to 4 carbon atoms with a polyhydric alcohol having at least 5 carbon atoms dispersed in water under alkaline conditions and to the process of preparing the same.

One of the objects of the present invention is to produce an oil-in-water emulsion of a glyceride oil modified alkyd resin with the reaction product of an aliphatic polycarboxylic acid, an oil fatty acid and the adduct of an alkylene oxide having between 2 and 4 carbon atoms with a polyhydric alcohol having at least 5 carbon atoms dispersed in water under alkaline conditions. A further object of the present invention is to produce an oil-in-water emulsion of the class described, which has application particularly in the coating resins field. These and other objects of the present invention will be discussed in greater detail hereinbelow.

GLYCERIDE OIL MODIFIED ALKYD RESINS

The first component used in the practice of the present invention is a glyceride oil modified alkyd resin. These alkyd resins are well known in the art and are prepared by reacting a polycarboxylic acid with a polyhydric alcohol in the presence of a glyceride oil or their fatty acids or their monoglycerides.

The polycarboxylic acids which are used to prepare these alkyd resins are generally preferably those which are free from non-benzenoid unsaturation. Representative of these acids are phthalic, oxalic, malonic, succinic, glutaric, sebacic, adipic, pimelic, suberic, azelaic, citric, tartaric, malic, tricarballylic and the like. Whenever available, the anhydrides of these acids may readily be used. Quite obviously, combinations of these acids and/or their anhydrides may be used. In these conventional alkyd resins, the polycarboxylic acids free from non-benzenoid unsaturation present will amount to at least about 90% by weight based on the total weight of polycarboxylic acid used. Minor amounts of alpha,beta unsaturated polycarboxylic acids may be used in the preparation of these alkyd resins. The amount of these alpha,beta ethylenically unsaturated acids, which may be used should not exceed about 10% by weight based on the total weight of polycarboxylic acid used. Amongst these alpha,beta ethylenically unsaturated polycarboxylic acids which may be used are maleic, fumaric, aconitic, itaconic and the like. Quite obviously, these acids may be used in combination with one another and whenever available, the anhydrides of these acids may be used either singly, or in combination with one another, or in combination with the acids of the same category.

The preferred polycarboxylic acid to be used is phthalic anhydride. Amongst the polyhydric alcohols which may be used in the preparation of the alkyd resins used in the present invention are glycerol, ethylene glycol, diethylene glycol, pinacol, arabitol, xylitol, mannitol, trimethylol propane, trimethylol ethane, sorbitol, pentaerythritol, dipentaerythritol, propylene glycol, dipropylene glycol, the alkane diols and the like. Obviously, these polyhydric alcohols may be used in combination with one another. If mixtures of these polyhydric alcohols are to be used, it is generally desired that the mixture of alcohols have an average functionality of at least about 3. For most practical purposes, glycerol is the preferred polyhydric alcohol. The amount of polyhydric alcohol which is used in the preparation of these alkyd resins will generally be in an amount sufficient on a purely stoichiometrical basis to provide an excess of about 25% over and beyond that amount required to provide complete esterification of the acid components present.

The oils used to modify the alkyd resins used in the composition of the present invention are the glyceride oils either vegetable or animal. These oils may be either non-drying, semi-drying or drying oils. They may be used in amounts varying over a broad range such as the amounts used to produce short oil alkyd resins, medium oil alkyd resins or long oil alkyd resins. Among the oils which may be used advantageously are coconut oil, palm kernel oil, palm oil, babasu, rape, mustard seed oil, olive oil, sesame oil, corn oil, cottonseed oil, soya oil, sunflower, walnut oil, linseed oil, perilla oil, castor, either raw or dehydrated oil, tung oil, oiticica, whale oil, menhaden oil, sardine oil, herring and the like. In addition to using the oils recited hereinabove, one may use the fatty acids derived therefrom or talloil fatty acids. Still further, one may make use of the monoglycerides of these fatty acids. Quite obviously, these oils and/or their fatty acids and/or their monoglycerides may be used in combination with one another.

In preparing the oil modified alkyd resin of the present invention, one would generally carry out the esterification reaction of the polycarboxylic acid and the polyhydric alcohol in the presence of the oil material at conventional temperatures in the order of about 200–260° C. for a period of time sufficient to give an acid number between about 100 and about 5. One skilled in the art will exercise the known precautions to avoid gelation of the alkyd resin by overheating or prolonged heating at elevated temperatures.

THE ADDUCT

The adduct used to prepare the reaction product which is the second component used in the composition of the present invention is prepared by reacting an alkylene oxide with a polyhydric alcohol having at least five carbon atoms and at least four alcoholic hydroxy groups.

Amongst the alkylene oxides which may be used are ethylene oxide, propylene oxide and butylene oxide. These oxides may be used either singly or in combination with one another.

A special group of polyhydric alcohols are used to form the adduct with the alkylene oxides. These alcohols must have at least five carbon atoms such as pentaerythritol and at least four hydroxy groups. Representative members of this category of polyhydric alcohols in addition to pentaerythritol and dipentaerythritol, sorbitol, mannitol, alpha, methyl Δ glucoside and the like. These polyhydric alcohols may be used either singly or in combination with one another. The preferred polyhydric alcohol is sorbitol. The preferred alkylene oxide is ethylene oxide.

These adducts may be prepared by reacting the alkylene oxides with the polyhydric alcohol over a comparatively wide range of molecular weights. For instance, one may use between about 3 mols of the alkylene oxide per hydroxy group in the alcohol to about 7 mols of the alkylene oxide per hydroxy group of the polyhydric alcohol. Preferably, one would use about 5 mols of alkylene oxide per hydroxy group in the polyhydric alcohol especially when the alkylene oxide is ethylene oxide and the polyhydric alcohol is sorbitol.

The adduct thus prepared is then reacted with an aliphatic carboxylic acid and glyceride oil fatty acid and preferably an unsaturated fatty acid such as those mentioned hereinabove. Of the polycarboxylic acids, which may be used, one can readily utilize either the saturated or the unsaturated polycarboxylic acids. The alpha, beta ethylenically unsaturated polycarboxylic acids which may be used are maleic, fumaric, aconitic, itaconic, and the like. Whenever available, the anhydrides of these acids may be used. Still further, these acids and/or their anhydrides may be used singly or in combination with one another. Amongst the saturated aliphatic polycarboxylic acids, which may be used are malonic, succinic, glutaric, sebacic, adipic, pimelic, suberic, azelaic, citric, tartaric, malic, tricarballylic and the like. These polycarboxylic acids and/or their anhydrides, whenever available, may be used in combination with one another or in combination with the alpha, beta ethylenically unsaturated polycarboxylic acids and/or their anhydrides.

Among the fatty acids which are reacted with the adduct together with the aliphatic polycarboxylic acids are the fatty acids derived from animal and vegetable oils. Although these fatty acids may be saturated, for best results, it is preferred that the unsaturated fatty acids be used, particularly those which have 18 carbon atoms in the chain. Illustrative of these preferred fatty acids are oleic, linoleic, linolenic, elaeostearic, licanic, ricinoleic and the like. One could use fatty acids having a lesser number of carbon atoms in the chain such as myristoleic, palmitoleic and the like, even erucic and the like. These fatty acids may be used either singly or in combination with one another. Although the component 2 of the composition of the present invention may be comprised of the reaction product of the aliphatic polycarboxylic acid, an oil fatty acid, and the adduct of an alkylene oxide and a polyhydric alcohol alone, it is preferred that there be added to the system to become an integral part of the reaction product of component 2, a significant amount of a rosin acid. When the adduct, which is a complex polyhydric alcohol is reacted with the mixture of acids, a sufficient amount of adduct should be utilized to insure that upon substantially complete esterification based on relatively low acid number and on stoichiometrical calculations that there will be an excess of about 20–25% hydroxyl compound to get such a result. When the esterification reaction is completed, the acid number may vary between about 5 and 100, but preferably about 15–20.

In the preparation of the composition of the present invention, the conventional oil modified alkyd resin is first prepared and when the esterification is substantially completed, the component 2, freshly prepared, and in a warm condition is poured gradually with constant stirring into the warm alkyd resin. When the blending has been completed, the mixture of 1 and 2 is poured into water and dispersed by constant agitation such as stirring. The aqueous dispersion is then rendered alkaline by use of a suitable alkalizing agent such as ammonium hydroxide. As an alternative approach, the water may be rendered alkaline prior to the addition of the blend of resins so that the resinous materials are rendered alkaline simultaneously upon emulsification to form the oil-in-water emulsion. Any pH on the alkaline side can be utilized for the final composition although it is preferred that the pH of the final composition be between 8 and 9. The amount of resin mixture introduced into the water can vary very substantially depending on the solids content for the coating composition desired such as 5% up to about 60% solids based on the total weight of the emulsion. Ordinarily, for most purposes, a solids content of about 40% to about 50% resin solids based on the total emulsion is preferred. The ultimate composition as produced may be used as coating compositions and may be applied by spraying, brushing, roller coating, knife or spatula application or the like. As prepared, the compositions of the present invention have a milky white appearance but are exceedingly stable and do not tend to separate out into two or more phases on standing even for prolonged periods of time. Notwithstanding, the milky white appearance of the emulsion, when applied to a given surface and permitted to air dry, these coatings produce clear films which are substantially completely free of such defects as pinholing, cratering, orange peel and the like.

It can be seen from the above that if a clear, coating composition is desired, the resinous emulsion may be used, if preferred. On the other hand, if one would like a colored coating composition, one could make use of conventional pigments and dyes, to produce colored coating compositions, ranging from black to white, including the pastels. If acidic pigments are used, additional alkalizing material should be used such as ammonium hydroxide in order to complete the pH of the ultimate emulsion on the alkaline side and preferably between 8 and 9.

The resin solids content of these emulsions can be varied significantly as indicated briefly hereinabove. For most purposes, the emulsion should contain at least about 50% of water. This concentration of solids is generally very satisfactory for brushing or roller coating. For spraying purposes, however, it may often be desirable to have a lesser resin solids such as 30–49%. If, upon dilution, one finds that the viscosity has dropped too low, one may thicken the emulsion by adding additional resin solids of the same class or one may add other thickeners such as carboxy methyl cellulose, methyl cellulose, magnesium aluminum silicate and the like.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

ALKYD RESIN A

Into a suitable reaction vessel equipped with thermometer, stirrer and reflux condenser, there is introduced 148 parts of phthalic anhydride, 200 parts of distilled talloil, 25 parts of ethylene glycol, 15.5 parts of Dow Polyol 565 (an aromatic glycol) 1,1'-isopropylidenebis(p-phenyleneoxy)di-2-propanol and 82 parts of pentaerythritol. The charge is heated gradually to about 245° C. and held at that temperature until the acid number is 18. The charge is cooled to 200° C. and is poured solid.

EMULSIFIER 1

Into a suitable reaction vessel equipped with thermometer, stirrer and reflux condenser, inert gas inlet and outlet tubes, there is introduced 300 parts of the adduct of 1 mol of sorbitol and 30 mols of ethylene oxide, 24 parts of fumaric acid, 157 parts of linseed oil fatty acids, and 24 parts of gum rosin. The mixture is heated gradually with constant stirring to a temperature about 230–235° C. under an atmosphere of nitrogen gas until an acid number of 22 is reached. The resin thus produced is cooled to 100° C. and is cut to a 50% solids solution with water.

Example 1

30 parts of the alkyd resin A is blended with 24 parts of emulsifier 1 solution (50% solids in water) and the mixture is heated with constant stirring. When the mixture is thoroughly melted and fluid, there is added 1 part of a 10% aqueous solution of ammonium hydroxide and 30 parts of water with constant stirring until a smooth "oil-in-water" emulsion is formed. A pour-out on clear glass produces a smooth, continuous film that is glossy, non-grainy and dries rapidly to a slightly tacky condition. On the addition of the usual paint drier such as cobalt naphthenate, the drying rate is accelerated substantially so that the film dries tack-free in about 16 hours.

Example 2

Into a suitable mixing vessel, there is introduced 72 parts of the resin emulsion prepared according to Example 1 (cut to 50% solids with water), 90 parts of a 1% aqueous dispersion of morpholine, 118 parts of a titanium dioxide pigment, 29 parts of calcium carbonate, 0.4 part of a 24% aqueous solution of lead octoate and 0.33 part of 6% cobalt as cobalt naphthenate. The formulation is charged to a pebble-mill and milled overnight. When the resultant composition is brushed on frosted glass, it dried in 20 minutes to a smooth lusterless surface. After four days, it had a pencil hardness of 3B. After 3 hours immersion in water, the paint film was only slightly softened and recovery on drying out was entirely satisfactory.

RESIN EMULSIFIER 2

Into a suitable reaction vessel equipped as in emulsifier 1, there is introduced 510 parts of an adduct of 1 mol of sorbitol and 20 mols of ethylene oxide, 380 parts of linseed oil fatty acids, 162 parts of gum rosin, 58 parts of fumaric acid. The charge is heated gradually to about 235° C. while continuously bubbling nitrogen gas therethrough. The charge is held for an acid number of 25.1, cooled and poured solid.

ALKYD RESIN B

Into a suitable reaction vessel equipped as in alkyd resin A, there is introduced 400 parts of phthalic anhydride, 505 parts of distilled talloil, 89 parts of talloil fatty acids, 76 parts of ethylene glycol, and 222 parts of pentaerythritol. The charge is heated up to 245° C. and held at that temperature for about 1 hour. The charge is then cooled gradually to about 225° C. and maintained at that temperature for about 2 hours. The charge is then cooled to about 200° C. and then held at that temperature for about 1 hour. The charge is finally cooled to 150° C.

Example 3

While holding the sample thus prepared at that temperature, there is added to 195 parts thereof 65 parts of the emulsifier 2 and the components are thoroughly mixed in a suitable mixing vessel. After cooling to 120° C., 260 parts of a 3% aqueous solution of morpholine at 65° C. is added with further agitation. The agitation is continued for about 12 minutes. Thereupon, 130 parts of water containing 2% ammonia (28%) was added and the emulsion is cooled to 30° C. When pigmented, this composition produced a very satisfactory flat wall enamel.

EMULSIFIER 3

Into a suitable reaction vessel equipped as in emulsifier 1, there is introduced 600 parts of the reaction product of 1 mol of sorbitol, and 30 mols of ethylene oxide, 314 parts of linseed oil fatty acids, 134 parts of rosin and 48 parts of fumaric acid. The charged materials are heated gradually to about 230° C. and maintained at that temperature with nitrogen gas bubbling therethrough until an acid number of 20.0 is obtained. The reaction product thus produced is cooled to 150° C. and poured out into a suitable container.

Example 4

To 868 parts of the alkyd resin B, there is added 217 parts of emulsifier 3 and the 2 components are mixed thoroughly at 125° C. for 1 hour. The mixture thus prepared is poured slowly into 1200 parts of water and 24 parts of morpholine held at 90° C. The solids is about 48% and the emulsion produced is a white milky liquid. When poured on clear glass, this emulsion dried to a smooth continuous glossy film. Furthermore, this emulsion endured 12 freeze-thaw cycles (24 hours at —15° F. and 20-24 hours at 73° F.) without separation, coagulation or breaking. The mechanical stability of the emulsion is exceptional. A jar half filled with pebbles and emulsion was rolled for 10 days with no detrimental effects to the emulsion or to a film drawn down therefrom. This emulsion was diluted 1:50 with water and no separation occurred in 14 days.

Example 5

A flat wall enamel is prepared from the emulsion of Example 4 in the same manner as shown in Example 2. This paint was brushed on dull and glossy paper and dried in 20 minutes to a lusterless appearance. This same paint when applied to frosted glass and air-dried for 7 days withstood 300 scrub cycles from a brush and soap solution.

EMULSIFIER 4

Into a suitable reaction vessel equipped as in emulsifier 1, there is introduced 191 parts of the reaction product of 1 mol of dipentaerythritol and 30 mols of ethylene oxide, 32.5 parts of gum rosin, 76 parts of linseed oil fatty acids, 11.6 parts of fumaric acid. The charge is then mixed thoroughly together and reacted at a temperature of about 230° C. for about 2 hours, cooled to 100° C. and poured into a suitable container. The acid number was 25.2.

Example 6

Into a suitable reaction vessel equipped as in Example 1, there is introduced 195 parts of alkyd resin B. There is then added 65 parts of emulsifier 4 and the components blended by mixing for about 1 hour at 120° C. There is then added with constant agitation 320 parts of a 3% aqueous solution of morpholine heated at 65° C. and held at that temperature for 15 minutes. The emulsion is then cooled to 25° C. and reduced to 40% solids with 2% aqueous solution of ammonia. The emulsion, thus prepared, provided a very suitable flat enamel.

EMULSIFIER 5

Into a suitable reaction vessel equipped as in emulsifier 1, there is introduced 59 parts of succinic acid, 380 parts of linseed oil fatty acids, 162 parts of gum rosin and 725 parts of the adduct of 1 mol of sorbitol and 30 mols of ethylene oxide. The charge is mixed together and then reacted at a temperature of about 245° C. to an acid number of 16.8. The charge is cooled and poured.

Example 7

Into a suitable reaction vessel equipped as in Example 1, there is introduced 400 parts of alkyd resin B. Thereto, there is added 100 parts of emulsifier 5 and the components are thoroughly mixed for about 1 hour at 120° C. 300 parts of a 2% aqueous solution of morpholine heated to 65° C. are added with agitation and the mixture is heated to 90° C., whereupon 200 additional parts of the aqueous solution of morpholine is added and again the emulsion is heated to 90° C. The charge is then cooled to 30° C. and reduced to 48% solids with additional water. A very satisfactory flat enamel is thus prepared from this emulsion.

EMULSIFIER 6

Into a suitable reaction vessel equipped as in emulsifier 1, there is introduced 27 parts of succinic acid, 242 parts of linseed oil fatty acids and 325 parts of the adduct of 1 mol of sorbitol and 30 mols of ethylene oxide. The charge is mixed and then heat reacted at 230° C. until an acid number of 11.0 is reached. The charge is cooled and poured into a suitable container.

Example 8

To 500 parts of alkyd resin B, there is added 125 parts of emulsifier 6 and the 2 components are thoroughly mixed at 125° C. There is then added 300 parts of a 3% aqueous solution of morpholine at 45° C. and held at 85–90° C. for 30 minutes. An additional 325 parts of a 3% aqueous morpholine solution at 50° C. is added and the emulsion heated to 91° C. The composition was then permitted to cool to room temperature for subsequent use as a flat coating composition.

ALKYD RESIN C

Into a suitable reaction vessel equipped as an alkyd resin A, there is introduced 148 parts of phthalic anhydride, 250 parts of distilled talloil, 85 parts of talloil fatty acids, and 133 parts of pentaerythritol. The charge is then heat reacted at about 230–240° C. until an acid number of 16 is reached. When a sample is cut to a 50% solids content with mineral spirits, a viscosity of 1300 cps. is reached. The resin is cooled to 150° C. for blending with emulsifier 3.

Example 9

To 1085 parts of the alkyd resin C, there is added 190 parts of emulsifier 3 and the 2 components are thoroughly mixed at about 150° C. and then cooled to 118° C. 500 parts of this mixture are introduced into a suitable reaction vessel and there is added thereto 150 parts of a 2% aqueous solution of morpholine and the mixture is agitated for about 4 minutes, whereupon 200 additional parts of a 2% aqueous solution of morpholine in 50 part portions are introduced at 3 minute intervals. When the addition is completed, the emulsion changed from water-in-resin to resin-in-water. Throughout this operation, the temperature is maintained at about 85° C. The emulsion thus produced is diluted to 50% solids by the addition of 150 parts of a 2% aqueous solution of morpholine. The diluted emulsion is cooled to 70° C. and poured into a suitable container. The emulsion thus produced had good mechanical stability and dilution stability in keeping with the previously described tests.

Example 10

A flat enamel is prepared from the emulsion of Example 9 in the following manner: 120 parts of the emulsion of Example 9, 108 parts of titanium dioxide, 60 parts of lithopone, 48 parts of a micronized calcium carbonate, 24 parts of diatomaceous silica, 140 parts of a 2% aqueous solution of morpholine, 0.87 part of a 24% solution of lead naphthenate, 0.52 part of a 6% solution of cobalt calculated as cobalt naphthenate, 0.32 part of an anti-oxidant and 2.4 parts of pine oil are introduced into a suitable pebble mill container and are milled on a pebble mill for about 17 hours. The paint, thus produced, is readily discharged from the mill. It had a consistency of 52 Krebs units and a pH of 9.0. It was taken up to 72 Krebs units by the addition of 6% by weight of a 5% aqueous solution of carboxy methyl cellulose.

ALKYD RESIN D

Into a suitable reaction vessel equipped as in alkyd resin A, there is introduced 148 parts of phthalic anhydride, 150 parts of castor oil (raw) and 95 parts of glycerine. The charge is heated together for 1 hour at about 280° C. and is then heated at 240° C. until an acid number of about 10 is reached.

Example 11

To 400 parts of the alkyd resin D, there is added 100 parts of emulsifier 3, and the two components are thoroughly mixed at 130° C. and then cooled to 118° C. Thereupon, 100 parts of a 2% aqueous solution of ammonia is added with constant agitation followed by the gradual addition of 511 additional parts of a 2% aqueous solution of ammonia, while maintaining the temperature at about 80° C. The pH is adjusted to 9.0 with 6 parts of a 28% aqueous solution of ammonia. The emulsion thus produced was an oil-in-water type and had a viscosity of 61 Krebs units.

Example 12

A flat enamel is prepared from the emulsion of Example 11 by incorporating into 325 parts of said emulsion (at 44% solids), 220 parts of titanium dioxide, 181 parts of a 3% aqueous solution of ammonia and 3.5 parts of pine oil. These components were introduced into a pebble mill and milled for about 24 hours. To 150 parts of the paste paint thus produced, there is added 48 parts of the emulsion of Example 11, which then resulted in a thin, sprayable enamel which was applied to a tin plated sheet steel panel and baked for 20 minutes at 300° F. The resultant film was smooth, white and tough and had a low luster.

EMULSIFIER 7

Into a suitable reaction vessel equipped as in emulsifier 1, there is introduced 58 parts of fumaric acid, 380 parts of linseed oil fatty acids, 162 parts of gum rosin and 757 parts of the adduct of 1 mol of sorbitol and 30 mols of ethylene oxide. The charge is heated at about 240° C. for about 4 hours to an acid number of 22.4. The charge is cooled and poured into a suitable container.

Example 13

To 400 parts of alkyd resin B, there is added 45 parts of emulsifier 7, and the two components are heated with constant agitation to 120° C. Thereupon, 450 parts of a 2% aqueous solution of ammonia is added in four approximately equal portions while maintaining the temperature at 85–89° C. The product produced was an oil-in-water emulsion of approximately 50% solids which was cooled and ready for use in a paint formulation.

It has been indicated hereinabove that the second component of the composition of the present invention can be prepared with or without any rosin acid content. It is preferred, however, that there be at least some rosin acid present. The total amount of rosin acid which may be utilized may vary between about 1% and 60% by weight based on the total solids of the second component sometimes referred to as the emulsifier component. For optimum results, the rosin acid content will fall within about 25% and 30% by weight based on the total solids weight of the emulsifier component.

The principal end use of the compositions of the present invention will be in the field of coating resins and may be used as primers, undercoats or topcoats. Additionally, the compositions of the present invention may be used as adhesives or in the treatment of textile fibers and fabrics or in the coating of paper or in the sizing of paper or paper pulp. The compositions of the present invention may be used either with or without additional coloring material such as dyes and/or pigments. When the composition is initially prepared, it has a milky appearance and one might presume that a film drawn down therefrom and dried would be white but it turns out that the film, when dried, and containing no added coloring matter is, in fact, a clear film so that if a colored film including white is desired, added pigment or dye is necessary.

There is nothing critical about the temperature of the respective components during the blending operation and these temperatures may be varied very significantly while still producing the same result. It has been indicated in the examples, however, that it is preferred to blend one component with the other while they are in a relatively warm condition.

The composition of the present invention may be, if desired, modified by blending with other resinous materials either water soluble or oil soluble such as the aminoplast type resinous material, the alkylated or non-alkylated melamine-formaldehyde resins, urea-formaldehyde resins, benzoguanamine-formaldehyde resins, dicyandiamine-formaldehyde resins or the thermoplastic latices such as the butadiene-styrene latices or the styrene-acrylonitrile latices or the acrylate latices and the like.

We claim:

1. A composition of matter comprising a mixture of (1) an alkyd resin modified with a member selected from the group consisting of glyceride oils, glyceride oil fatty acids and their monoglycerides and (2) the resinous reaction product of (a) an aliphatic polycarboxylic acid, (b) an oil fatty acid and (c) the adduct of an alkylene oxide having from 2–4 carbon atoms with a polyhydric alcohol having at least 5 carbon atoms and at least 4 hydroxy groups wherein said adduct contains from about 3 mols to about 7 mols of said alkylene oxide per hydroxy group of said polyhydric alcohol.

2. A composition of matter comprising an oil-in-water emulsion of (1) an alkyd resin modified with a member selected from the group consisting of glyceride oils, glyceride oil fatty acids and their monoglycerides and (2) the resinous reaction product of (a) an aliphatic polycarboxylic acid, (b) an oil fatty acid and (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, dispersed in water under alkaline conditions.

3. A composition of matter comprising an oil-in-water emulsion of (1) an alkyd resin modified with a member selected from the group consisting of glyceride oils, glyceride oil fatty acids and their monoglycerides, and (2) the resinous reaction product of (a) fumaric acid, (b) an oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol and (d) from about 1% to about 60% by weight based on the total solids of (2) of rosin acids, dispersed in water under alkaline conditions.

4. A composition of matter comprising an oil-in-water emulsion of (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) from about 1% to about 60% by weight based on the total solids of (2) of rosin acids, dispersed in water under alkaline conditions.

5. A composition of matter comprising an oil-in-water emulsion of (1) an alkyd resin modified with a member selected from the group consisting of glyceride oils, glyceride oil fatty acids and their monoglycerides and (2) the resinous reaction product of (a) an aliphatic polycarboxylic acid, (b) an unsaturated oil fatty acid, (c) the adduct of ethylene oxide with sorbitol wherein said adduct contains from about 3 mols to about 7 mols of ethylene oxide per hydroxy group in the sorbitol, dispersed in water under alkaline conditions.

6. A composition of matter comprising an oil-in-water emulsion of (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and sorbitol wherein said adduct contains from about 3 mols to about 7 mols of ethylene oxide per hydroxy group in the sorbitol, and (d) from about 1% to about 60% by weight based on the total solids of (2) of rosins acids, dispersed in water under alkaline conditions.

7. A composition of matter comprising an oil-in-water emulsion of (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and pentaerythritol wherein said adduct contains from about 3 mols to about 7 mols of ethylene oxide per hydroxy group in the pentaerythritol and (d) from about 1% to about 60% by weight based on the total solids of (2) of rosin acids, dispersed in water under alkaline conditions.

8. A composition of matter comprising an oil-in-water emulsion of (1) an alkyd resin modified with a member selected from the group consisting of glyceride oils, glyceride oil fatty acids and their monoglycerides and (2) the resinous reaction product of (a) an aliphatic polycarboxylic acid, (b) an unsaturated oil fatty acid, (c) the adduct of ethylene oxide and dipentaerythritol wherein said adduct contains from about 3 mols to about 7 mols of ethylene oxide per hydroxy group in the dipentaerythritol and (d) from about 1% to about 60% by weight based on the total solids of (2) of rosin acids, dispersed in water under alkaline conditions.

9. A composition of matter comprising an oil-in-water emulsion of (1) an alkyd resin modified with a member selected from the group consisting of glyceride oils, glyceride oil fatty acids and their monoglycerides, and (2) the resinous reaction product of (a) maleic acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) from about 1% to about 60% by weight based on the total solids of (2) of rosin acids, dispersed in water under alkaline conditions.

10. A composition of matter comprising an oil-in-water emulsion of (1) an alkyd resin modified with a member selected from the group consisting of glyceride oils, glyceride oil fatty acids and their monoglycerides, and (2) the resinous reaction product of (a) fumaric acid (b) linseed oil fatty acids, (c) the adduct of ethylene oxide and sorbitol wherein said adduct contains from about 3 mols to about 7 mols of ethylene oxide per hydroxy group in the sorbitol, and (d) from about 1% to about 60% by weight based on the total solids of (2) of rosin acids, dispersed in water under alkaline conditions.

11. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) an aliphatic polycarboxylic acid, (b) an oil fatty acid and (c) the adduct of ethylene oxide with a polyhydric alcohol having at least 5 carbon atoms and at least four alcoholic hydroxy groups wherein said adduct contains from about 3 mols to about 7 mols of ethylene oxide per hydroxy group of said polyhydric alcohol and dispersing in water under alkaline conditions.

12. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) an aliphatic polycarboxylic acid, (b) an oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) from about 1% to about 60% by weight based on the total solids of (2) of rosin acids and dispersing in water under alkaline conditions.

13. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) fumaric acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and dispersing in water under alkaline conditions.

14. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) from about 1% to about 60% by weight based on the total solids of (2) of rosin acids, and dispersing in water under alkaline conditions.

15. A process for the preparation of an oil-in-water emulsion comprising blending thoroughly (1) an alkyd resin modified with a member selected from the group consisting of glyceride oils, glyceride oil fatty acids and their monoglycerides and (2) the resinous reaction product of (a) an aliphatic polycarboxylic acid, (b) an unsaturated oil fatty acid, (c) the adduct of ethylene oxide with sorbitol wherein said adduct contains from about 3 mols to about 7 mols of ethylene oxide per hydroxy group in the sorbitol, dispersing in water under alkaline conditions.

16. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and sorbitol wherein said adduct contains from about 3 mols to about 7 mols of ethylene oxide per hydroxy group in the sorbitol, and (d) from about 1% to about 60% by weight based on the total solids of (2) of rosin acids, dispersing in water under alkaline conditions.

17. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and pentaerythritol wherein said adduct contains from about 3 mols to about 7 mols of ethylene oxide per hydroxy group in the pentaerythritol and (d) from about 1% to about 60% by weight based on the total solids of (2) of rosin acid, dispersing in water under alkaline conditions.

18. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) an aliphatic polycarboxylic acid, (b) an unsaturated oil fatty acid, (c) the adduct of ethylene oxide and dipentaerythritol wherein said adduct contains from about 3 mols to about 7 mols of ethylene oxide per hydroxy group in the dipentaerythritol and (d) from about 1% to about 60% by weight based on the total solids of (2) of rosin acids, dispersing in water under alkaline conditions.

19. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) maleic acid, (b) an unsaturated oil fatty acid, (c) the adduct of ethylene oxide with a polyhydric alcohol having at least 5 carbon atoms and at least four hydroxy groups wherein said adduct contains from about 3 mols to about 7 mols of ethylene oxide per hydroxy group of said polyhydric alcohol, and (d) from about 1% to about 60% by weight based on the total solids of (2) of rosin acids, dispersing in water under alkaline conditions.

20. A process for the preparation of an oil-in-water emulsion comprising blending thoroughly (1) an alkyd resin modified with a member selected from the group consisting of glyceride oils, glyceride oil fatty acids and their monoglycerides, and (2) the resinous reaction product of (a) fumaric acid, (b) linseed oil fatty acids, (c) the adduct of ethylene oxide and sorbitol wherein said adduct contains from about 3 mols to about 7 mols of ethylene oxide per hydroxy group in the sorbitol, and (d) from about 1% to about 60% by weight based on the total solids of (2) of rosin acids, and dispersing in water under alkaline conditions.

References Cited in the file of this patent

UNITED STATES PATENTS

| | | |
|---|---|---|
| 2,338,558 | Wickwire | Jan. 4, 1944 |
| 2,360,394 | Burrell | Oct. 17, 1944 |
| 2,537,949 | Adams | Jan. 16, 1951 |
| 2,569,495 | Rheineck | Oct. 2, 1951 |
| 2,720,500 | Cody | Oct. 11, 1955 |